United States Patent [19]
Malmasson

[11] Patent Number: 5,828,711
[45] Date of Patent: Oct. 27, 1998

[54] SEALING DEVICE FOR AN INSTRUMENTATION COLUMN

[75] Inventor: Jacques Malmasson, Evry, France

[73] Assignees: Framatome, Courbevoie; Atea, Société Atlantique de Techniques Avanceés, Carquefou, both of France

[21] Appl. No.: 718,402
[22] PCT Filed: Mar. 1, 1995
[86] PCT No.: PCT/FR95/00243
§ 371 Date: Sep. 30, 1996
§ 102(e) Date: Sep. 30, 1996
[87] PCT Pub. No.: WO95/27287
PCT Pub. Date: Oct. 12, 1995
[51] Int. Cl.$^6$ .................................... G21C 13/00
[52] U.S. Cl. ........................... 376/204; 376/245
[58] Field of Search ..................... 376/203, 204, 376/245, 247, 254, 205

[56] References Cited

U.S. PATENT DOCUMENTS 5,084,228  1/1992  Lhwillier ........................... 376/203
5,323,428  6/1994  Porter et al. ....................... 376/204
5,513,227  4/1996  Margotta et al. .................. 376/204

FOREIGN PATENT DOCUMENTS

0 164 524  12/1985  European Pat. Off. .
0 244 669  11/1986  European Pat. Off. .
   0229703   7/1987  European Pat. Off. ........ 376/205
0 266 211   5/1988  European Pat. Off. .
2 642 217   7/1990  France .
27 58 192   6/1979  Germany .
   2170562   8/1986  United Kingdom .

*Primary Examiner*—Harvey E. Behrend
*Attorney, Agent, or Firm*—Pollock, Vande Sande & Priddy

[57] ABSTRACT

A sealing device comprising a supporting assembly (9) containing sealing members (16) supporting the instrument column (5), and an assembly (17, 18) for lifting the instrument column (5) in sealing engagement with the supporting members (16). The sealing members (16) supporting the instrument column (5) include a clamping ring (28) and at least one O-ring seal (29, 30). Axial movement of the instrument column (5) enables clamping of the inner seal (30) via the clamping ring (28). When axial movement of the instrument column (5) is restricted, the seals may be clamped by means of a suitably sized clamping ring (28).

4 Claims, 5 Drawing Sheets

SEALING DEVICE FOR AN INSTRUMENTATION COLUMN

FIELD OF THE INVENTION

The invention relates to a sealing device for an instrumentation column, and in particular for a thermocouple column penetrating the head of a pressurized-water nuclear reactor vessel.

BACKGROUND OF THE INVENTION

In pressurized-water nuclear reactors, the vessel containing the core of the reactor includes a head of substantially hemispherical shape having openings in which there are fixed adapters allowing the passage of the control rods of the reactor and instrumentation columns such as thermocouple columns of cylindrical shape. In each of the thermocouple columns there is arranged a set of thermocouples making it possible to measure the temperature of the coolant fluid at the outlet of a set of fuel assemblies of the core of the reactor.

Each one of the adapters includes a part projecting under the head providing guidance for the thermocouple column and a part projecting above the head including means for connecting a tubular bearing assembly of the thermocouple column, which assembly can be fixed in the extension of the adapter.

Inside the bearing assembly fixed to the adapter are arranged sealed bearing means intended to interact with a surface of the thermocouple column in order to provide the sealed passage of the thermocouple column through the bore in the bearing assembly extending the adapter in the axial direction.

The thermocouple column which passes through the bore in the bearing assembly and the bore in the adapter which are situated in the axial extension of one another includes an end which projects relative to the bearing assembly which is in engagement with a lifting device which works by pulling, allowing the thermocouple column to be moved in the axial direction. The bearing surface of the thermocouple column and the sealed bearing means of the bearing assembly can thus be brought into contact, with a certain pressure.

The sealed bearing means of the thermocouple column inside the bearing assembly generally consist of a bearing surface of frustoconical shape machined into the internal bore of the bearing assembly and the shape of which complements the shape of the bearing surface of the thermocouple column, and of a gasket which is compressed between the bearing surfaces of the thermocouple column and of the bearing assembly when clamping is performed by pulling on the upper end of the thermocouple column.

A drawback of such a sealing device is that it requires a certain amount of axial movement of the thermocouple column between its lowered unclamped position and its raised, leaktight clamped position, this distance of axial movement being defined rather vaguely by the position of the bearing surface inside the bearing assembly relative to the position of the bearing surface of the thermocouple column in the unclamped position.

After the nuclear reactor has been in use for a certain length of time, or after a certain number of operations of opening the vessel by removing the head, some thermocouple columns may become slightly deformed, so that they are no longer perfectly straight.

In this case, it may be difficult or even impossible to move the thermocouple column axially inside the adapter and the bearing assembly over sufficient distance to provide clamping of the sealing gasket.

It then becomes necessary to exchange the entire thermocouple column, which leads to substantial additional costs in the operation of the nuclear reactor.

To date, no device was known for sealing an instrumentation column such as a thermocouple column penetrating the head of the vessel of a nuclear reactor which allows sealed clamping of the column even in cases where the latter has suffered deformation which prevents sufficient axial movement inside the adapter to allow the sealing gaskets to be compressed.

FR-A-2,642,217 describes a sealing device for an instrumentation column penetrating the vessel head of a nuclear reactor in which the bearing assembly consists of two successive lengths which are assembled in such a way that the instrumentation column can be extracted quickly and easily even in the event of seizure of the parts for clamping and tightening the bearing assembly onto the end of the adapter.

However, in this improved device, no means have been provided to make it possible, if need be, to reduce the axial movement required for ensuring sealed clamping of the instrumentation column.

SUMMARY OF THE INVENTION

The object of the invention is to provide a sealing device for an instrumentation column, and, in particular, for a thermocouple column penetrating the head of a pressurized-water nuclear reactor vessel, inside an adapter of tubular shape fixed into a penetration opening of the head and projecting outside the vessel head, including a tubular bearing assembly fixed to the end of the adapter outside the head and in its axial extension as well as a means for pulling on an end of the instrumentation column which projects outside the bearing assembly, allowing the instrumentation column to be moved in the axial direction of the adapter, in order to bring a bearing surface of the instrumentation column into contact with sealed bearing means arranged inside the bearing assembly, it being possible for this device to seal the instrumentation column even if this instrumentation column has deformation which limits the axial movement of the instrumentation column inside the adapter and the bearing assembly.

To this end, the sealed bearing means of the instrumentation column include:

- a clamping ring having a contact surface, the shape of which complements the shape of the bearing surface, of the thermocouple column mounted so that it can move in the axial direction, inside the bore of the bearing assembly, so that its contact surface faces the bearing surface of the instrumentation column inside the bearing assembly, and
- at least one annular sealing gasket interposed between a face of the clamping ring opposite its contact surface and an internal surface of the bearing assembly, so as to provide a seal between the external surface of the instrumentation column and the bore of the bearing assembly, through interaction of the clamping ring, of the sealing gasket and of the internal surface of the bearing assembly under the effect of an axially-directed force exerted by the instrumentation column coming into contact with the clamping ring as it is moved under the effect of a pulling force exerted on its end.

BRIEF DESCRIPTION OF THE DRAWINGS

In order to make the invention easy to understand, several embodiments of a sealing device according to the invention will now be described by way of example with reference to the appended drawing figures.

DESCRIPTION OF PREFERRED EMBODIMENTS

Figures 1, 2:
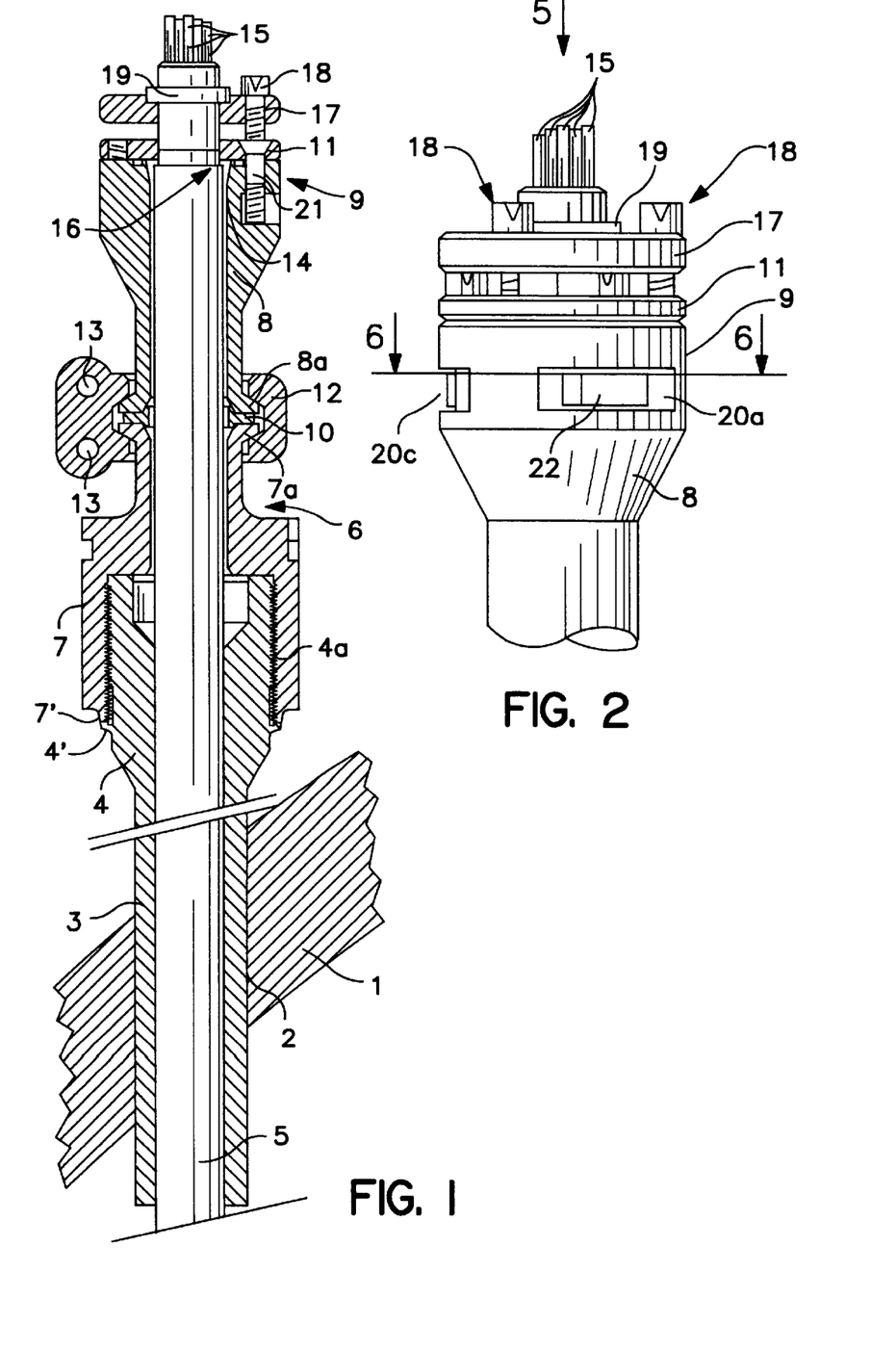
FIG. 1 is a view in section on a vertical plane of a penetration through the head of a vessel of a nuclear reactor, allowing the passage of a thermocouple column and equipped with a sealing device according to the invention.
FIG. 2 is a view in side elevation of the upper part of the penetration showing the sealing device according to the invention.

FIG. 1 shows part of the vessel head 1 of a pressurized-water nuclear reactor through which there passes an opening 2 in which there is fixed, in a sealed manner, by welding, an adapter 3 including a part projecting below the vessel head and providing guidance for a thermocouple column 5 and a part projecting above the vessel head 1 constituting a flared part 4, on the outer surface of which a screw thread 4a is machined.

Fixed in the axial extension of the adapter 3 on the upper part 4 of the adapter 3 is an assembly 6 for fixing and sealing the thermocouple column 5, by means of a lower part 7 or extension including a tapped bore which is engaged over the threaded part 4a of the flared part 4 of the adapter 3. The assembly for fixing and sealing the thermocouple column 5 is thus assembled to the end of the adapter 3. The flared part 4 of the adapter 3 and the lower part 7 of the fixing and sealing assembly 6 include circular joints 4', 7' which come into coincidence when the extension 7 is fully screwed onto the flared part 4. The joints 4' and 7' are joined together by welding, so as to seal the screwed connection between the components 4 and 7.

The head and the penetration adapters 3 are made at the factory and transported to the site where the nuclear reactor is being installed.

The fixing and sealing devices 6 for the thermocouple columns 5 are attached and fixed to the upper ends of the adapters on the reactor site.

The lower part of the fixing and sealing assembly 6 is fixed to the end of the adapter, in such a way as to be able to be removed if need be by melting the junction region of the joints 4' and 7'. Such removal is carried out only for exceptional interventions or repairs to the thermocouple column penetration piece.

The fixing and sealing assembly 6 includes an upper part 8 which is assembled in sealed manner with the extension 7 with the interposition of a metal gasket 10 of special shape, the parts 7 and 8 of the fixing and sealing assembly being assembled using a clamping flange 12 made in two parts which can be joined together and clamped using screws introduced into openings 13 passing through the opposing lugs situated at the end of the two sector-shaped parts.

The clamping flange at its internal part has frustoconical bearing surfaces which come into clamping contact with corresponding frustoconical bearing surfaces machined on flared end parts 7a and 8a of the extension 7 and of the upper part 8, respectively, of the fixing and sealing assembly 6.

The upper part 8 of the fixing assembly 6 could be fixed to the extension 7 by welding or made as a single piece with the extension 7, or even consist of the upper part of the adapter 3.

The adapter 3 and the fixing and sealing assembly 6 are made in a tubular shape and arranged in the axial extension of one another, so as to form a passage for the thermocouple column 5 consisting of a tube for supporting and holding a set of thermocouples 15.

The upper part 8 of the fixing assembly 6 for the thermocouple column consists of a tube-shaped length of the bearing assembly 9 of the sealing device according to the invention. The bearing assembly 9 of the thermocouple column 5 additionally includes a cover 11 of annular shape attached to the tubular length and fixed in a way which will be described later. The tubular length 8 and the cover 11 of the bearing assembly 9 have bores which are arranged in the axial extension of one another and in the axial extension of the bore of the adapter 3.

The thermocouple column 5 has an upper part, the diameter of which is smaller than the diameter of its standing part, separated from this standing part by a shoulder of substantially frustoconical shape constituting the bearing surface 14 of the thermocouple column 5 inside the bearing assembly 9.

Sealed bearing means 16 engaged inside the bore of the tubular length 8 of the bearing assembly 9 come into contact with the bearing surface 14 of the thermocouple column 5 in its clamped position.

The thermocouple column 5 is moved between its unclamped position and its clamped position by a compression plate 17 penetrated by tapped openings and fitted with compression screws 18 engaged in the tapped openings and coming to rest with their ends on the heads of screws 21 for attaching the cover 11.

The plate 17 has a central opening allowing it to be engaged over the end part of the instrumentation column 5.

A pulling ring 19, the outside diameter of which is larger than the diameter of the central opening in the plate 17 and which consists of two half-rings engaged in a groove formed at the peripheral part of the thermocouple column in its upper part, allows the pulling force exerted by the plate 17 to be transmitted to the thermocouple column 5.

Reference will now be made to FIGS. 2, 3, 4A, 4B, 4C, 5 and 6 as a whole, for the description of the sealing device according to the invention, which includes the bearing assembly 9, the sealed bearing means 16 of the thermocouple column 5 and the compression plate 17.

The sealing device has been represented in FIG. 2 in lateral elevation and in its position for clamping the thermocouple column.

Figures 3, 4C:
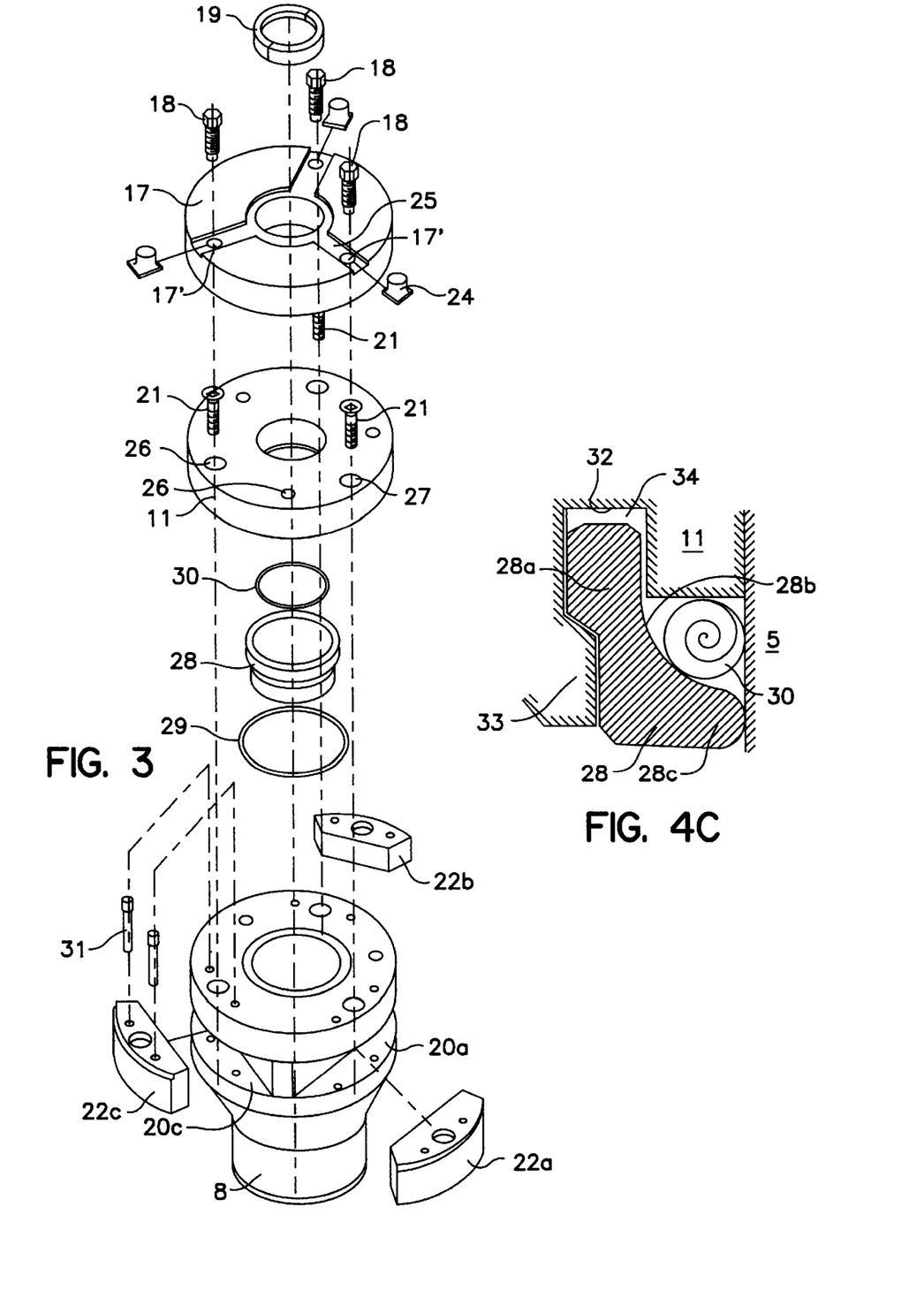
FIG. 3 is a view in exploded perspective of the elements forming the sealing device.
FIG. 4C is an enlarged view of detail C of FIG. 4A.

In FIG. 3, the various elements of which the sealing device is formed have been represented before assembly, in an exploded perspective view.

Figure 4A:
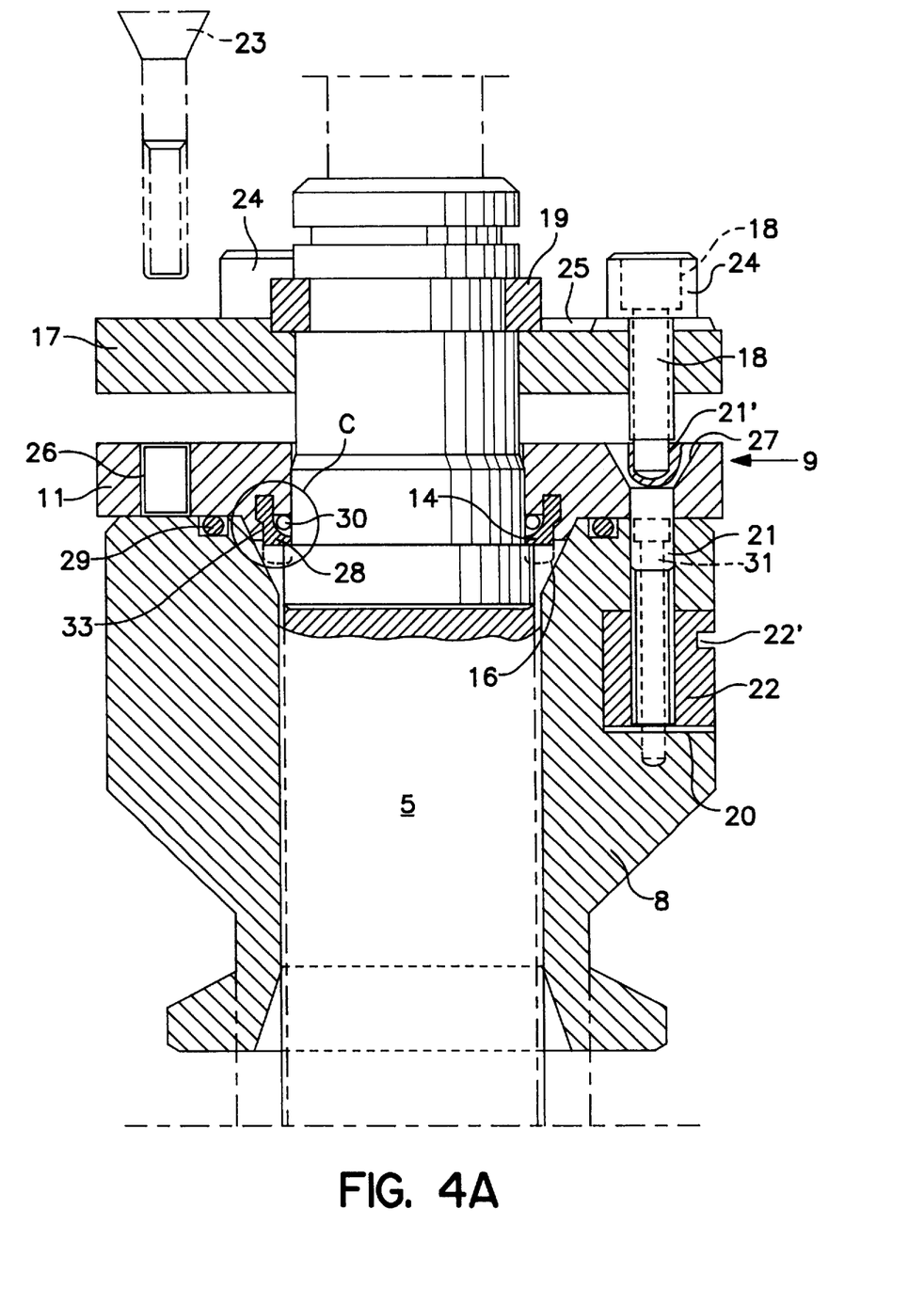
FIGS. 4A and 4B are views in section on an axial plane of the sealing device.
Figure 4B:
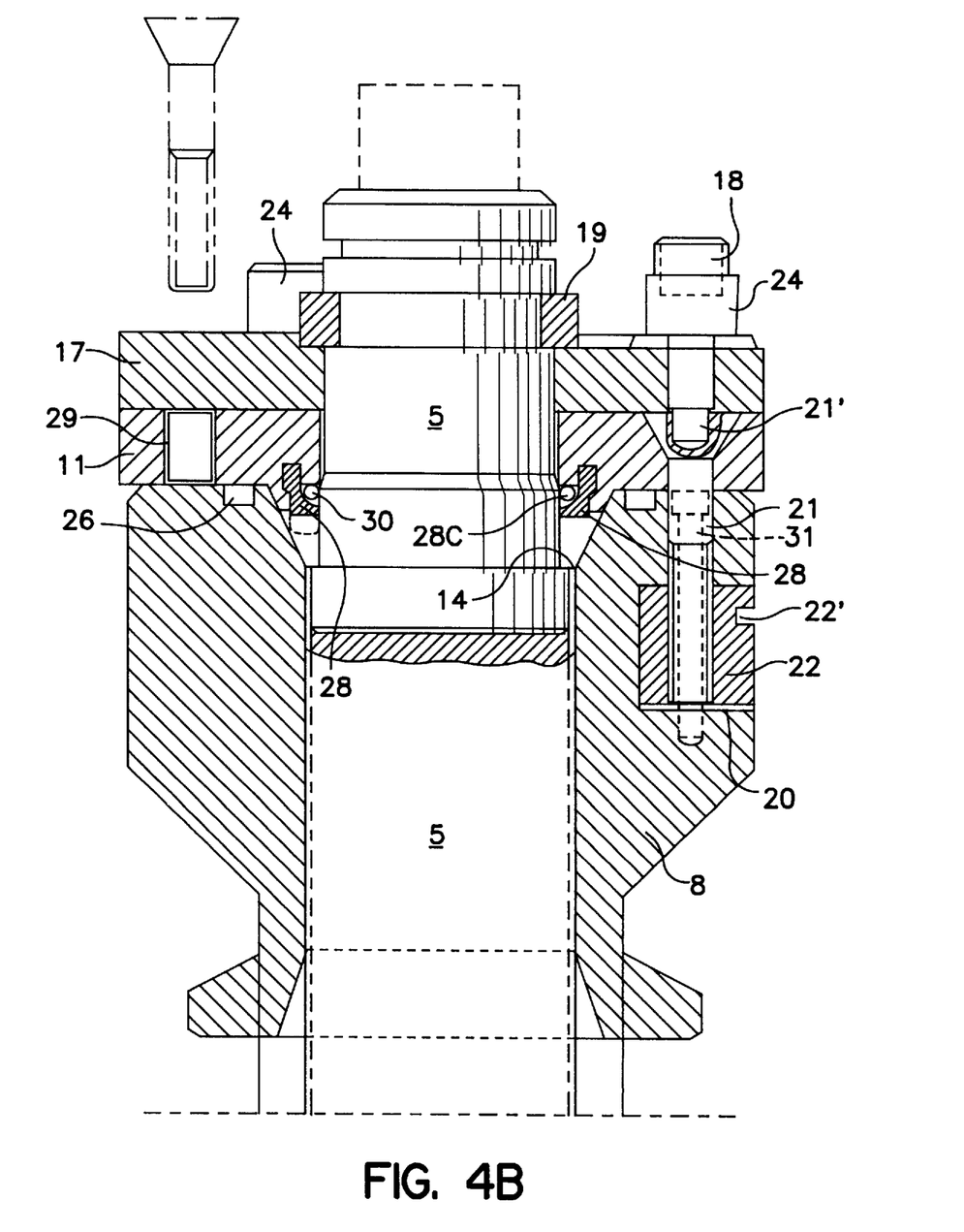
Figure 5:
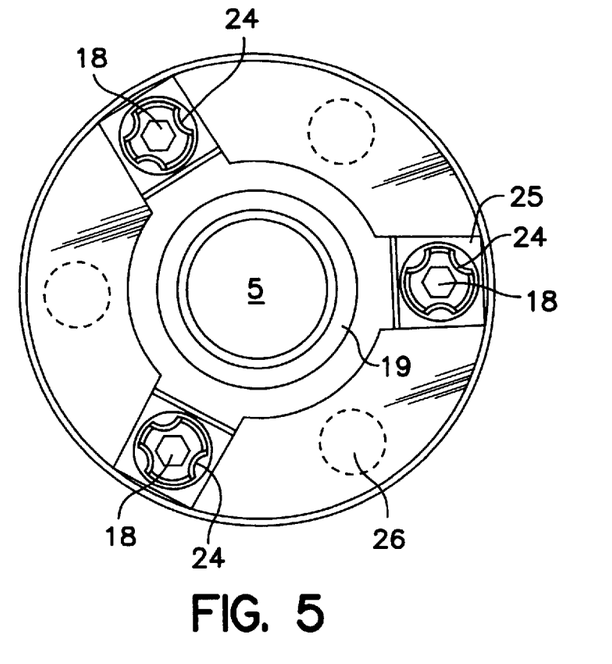
FIG. 5 is a view from above in the direction of arrow 5 of FIG. 2.

FIGS. 4A and 4B represent the sealing device in a view in section on an axial plane. In FIG. 4A, the device has been represented with the thermocouple column clamped in a sealed manner against the bearing assembly.

In FIG. 4B, the device has been represented with the thermocouple column in the unclamped position.

The upper part of the fixing assembly 6 consists of the bearing assembly 9 and the compression plate 17 clamping the thermocouple column 5.

The bearing assembly 9 includes the tubular length 8 and the cover 11 attached and fixed to the upper end of the tubular length 8.

As indicated earlier, the tubular length 8 may consist of a part which is attached and fixed in the axial extension of an adapter for penetrating the head of the vessel, either by means of a removable collar, or by means of a weld.

Figure 6:
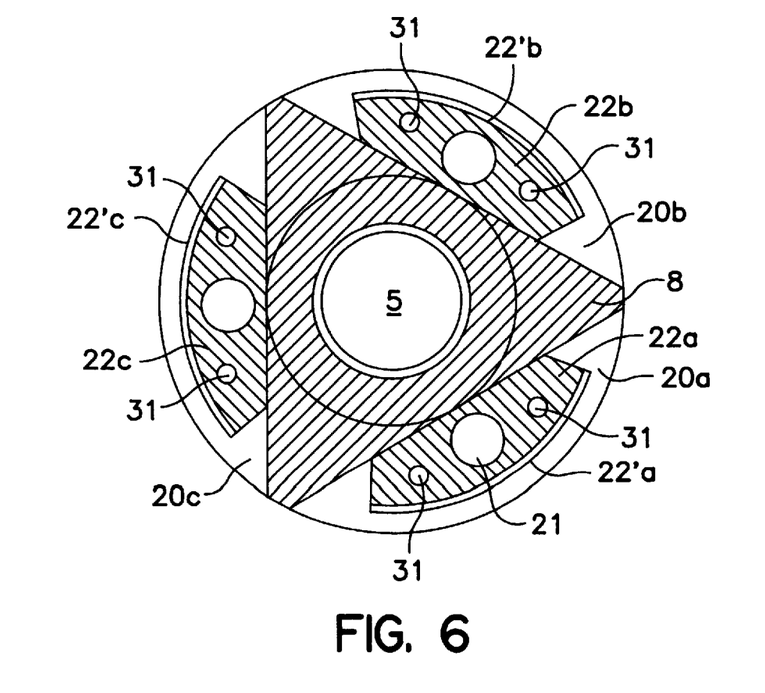
FIG. 6 is a view in section along line 6—6 of FIG. 2.

The tubular length 8 on its lateral surface includes three recesses 20a, 20b, 20c arranged at 120° from one another about the axis of the tubular length 8, as is visible particularly in FIGS. 2, 3 and 6.

The recesses 20a, 20b, 20c emerge on the lateral surface of the tubular length 8 and are each delimited by three flat surfaces, a lower flat surface, an upper flat surface, and an internal flat surface.

As can be seen in FIG. 6, the three internal flat surfaces of the three recesses 20a, 20b, 20c constitute three sides of the remaining section of the tubular length 8 at the recesses, which is substantially in the shape of an equilateral triangle.

The annular cover 11 constituting the upper part of the bearing assembly 9 which has the shape of a disc is fixed to the tubular length 8 by means of three screws 21 placed at 120° from one another about the axis of the bearing assembly 9 which are engaged in openings 27 penetrating the cover 11 and in openings placed in coincidence machined in the tubular length 8, so that each emerges in a recess 20.

Placed inside each of the recesses 20a, 20b and 20c is a corresponding fixing piece 22a, 22b, 22c including a tapped opening into which the threaded end of the corresponding screw 21 is screwed.

In addition, each of the fixing pieces 22 on each side of its tapped opening has two holes for the passage of fixing shanks 31, having a direction parallel to the axis of the tubular length 8. The fixing shanks 31 include a threaded part which is screwed into a tapped hole of the tubular length 8 and a head allowing screwing which, when the shank 31 is put in position, is housed in an opening emerging at the upper part of the tubular length 8.

The openings penetrating the fixing pieces 22 have a diameter larger than the diameter of the shanks 31, so that the fixing pieces 22 are rendered captive relative to the tubular length 8 by virtue of the shanks 31, but remain able to move in the axial direction inside the recesses 20 in order to clamp the cover 11 onto the upper end part of the tubular length 8.

Interposed between the cover 11 and the upper part of the tubular length 8 is a torus-shaped gasket 29 housed inside a groove machined in the upper part of the tubular length 8.

The gasket 29 is a metal gasket of the Helicoflex type. Such a Helicoflex gasket is a flexible gasket including a torus-shaped jacket produced by the non-closed rolling-up of a metal sheet inside which there is arranged a helical spring which causes the cross-section of the torus to expand.

Upon clamping, the torus-shaped jacket and the helical spring are compressed and provide a seal by elasticity.

The cover 11 is clamped by the screws 31, the head of which comes to bear inside openings 27 of cylindro-frustoconical shape passing through the cover 11.

The screws 21 have a countersunk head of frustoconical shape which, upon clamping, become fully housed inside an opening 27.

The threaded part of the screw is screwed into the tapped hole of the fixing piece 22.

Each of the fixing pieces 22 which have a flat internal face and a cylindrical external face includes, in its cylindrical external surface, a groove 22' where the fixing piece and the screw can be cut through using a circular saw or a grinding wheel in the event of the screw becoming seized inside the tapped hole.

In this way, the cover 11 can in all events be removed in order to gain access to the thermocouple column and to the sealed bearing means 16.

Machined inside the frustoconical-shaped heads of the screws 21 is an opening 21' allowing engagement of a tool for turning the screw 21 during clamping which accommodates the end of a screw 18 for lifting the compression plate 17, ensuring clamping of the thermocouple column.

Machined on the lower surface of the cover 11 are groove 32 and a projecting rim 33 which are coaxial with the central opening in the cover 11 allowing the passage of the thermocouple column 5.

The rim 33 which projects under the cover 11 internally includes two radially inwardly projecting parts separated by set-back parts constituting a first set of assembly elements of a bayonet-fastening device.

A clamping ring 28 is engaged via a fixing part 28a inside the groove 32 and on its external lateral surface has two parts set back radially inwards which complement the two radially projecting parts of the rim 33 which are separated by two radially projecting parts allowing a bayonet assembly between the clamping ring 28 and the cover 11.

The clamping ring 28, which has a substantially L-shaped cross-section, has an internal surface 28b which has the shape of a portion of a torus of circular section intended to come into bear against a Helicoflex gasket 30 constituting the interior sealing gasket of the thermocouple column. The clamping ring 28 and the Helicoflex gasket 30 constitute the internal part of the sealing means 16 of the thermocouple column 5. The Helicoflex gasket 29 constitutes the external sealing gasket for the thermocouple column.

The clamping ring 28 and the Helicoflex gasket 30 are mounted on the lower surface of the cover 11 by engaging the clamping ring 28, the surface 28b of which is in contact with the gasket 30, inside the groove 32, bringing the projecting parts of the outer surface of the ring 28 into coincidence with the set-back parts of the inner surface of the rim 33.

The clamping ring 28 is then fixed on the cover 11 by rotating the ring 28 about its axis by a quarter of a turn inside the groove 32. In this way the clamping ring 28 is bayonet-fastened, holding the Helicoflex gasket 30 on the cover 11.

The cover 11 can then be engaged over the upper end of the thermocouple column 5 in the lowered unclamped position, as represented in FIG. 4B.

The openings 27 penetrating the cover 11 are brought into coincidence with the openings penetrating the upper part of the tubular length 8, at each of the recesses 20. The cover is fixed on by introducing the fixing pieces 22 into the recesses 20 and screwing the screws 21 into the openings which have been brought into coincidence belonging to the cover 11, to the tubular length 8, and to the fixing pieces 22.

External sealing of the thermocouple column is provided by the Helicoflex gasket 29 clamped between the cover 11 and the upper part of the tubular length 8.

Internal sealing of the thermocouple column 5 is provided by compression of the Helicoflex gasket 30 by means of the clamping piece 28 which includes a frustoconical lower surface 28c against which the frustoconical surface 14 of the thermocouple column comes to bear when the thermocouple column is lifted by use of the compression plate 17, as represented in FIG. 4A.

The compression plate 17 has an annular shape, the central opening of the plate 17 allowing the passage of the upper part of the thermocouple column 5.

The plate 17 is penetrated by three tapped openings 17' placed at 120° from one another about the axis of the plate 17, in each of which openings a lifting screw 18 for the compression plate 17 may be engaged and fixed.

In order to lift the thermocouple column, the compression plate 17 is engaged over the upper part of the thermocouple column 5, the two-part ring 19 not being engaged in the corresponding groove of the thermocouple column.

The compression plate 17 is oriented such that the lower end parts of the screws 18 each engage in an opening 21' of the head of a screw 21.

The two-part ring 19 for lifting the thermocouple column is engaged in the corresponding groove of the upper part of the thermocouple column and comes to bear on the upper surface of the compression plate 17 which rests on the upper surface of the cover 11, as represented in FIG. 4B.

The plate and the thermocouple column are then lifted by screwing in the screws 18 which come to bear via their lower end part in the housings in the frustoconical screw heads of the screws 31 for attaching the cover 11.

The lifting of the plate 17 leads, via the two-part ring 19, to the lifting of the thermocouple column 5, the radially projecting frustoconical surface 14 of which comes to bear on the lower surface 28c of the clamping ring 28, as is visible in FIG. 4A.

Subsequent movement of the plate 17 and of the thermocouple column 5 causes clamping of the internal Helicoflex gasket 30, by means of the torus-shaped internal surface 28b of the clamping ring 28, as is visible in FIG. 4C.

The clamping ring 28 is mounted inside the groove 32 with axial clearance 34 so that this ring can move axially in order to clamp the gasket 30 which comes into sealed contact with the lower surface of the bearing cover 11 inside the groove 32, and in order to clamp the outer seal 29 against the outer surface of the thermocouple column 5. Thus complete sealing around the upper part of the thermocouple column 5 is ensured.

The screws 18 for the lifting of the plate 17 include a cylindrical head, by means of which they are tightened, and which is engaged inside a cup 24 including a cylindrical deformable collar integral with a base of substantially square shape engaged and prevented from rotating and from moving in terms of altitude in a radial dovetail slot 25 machined in the upper surface of the plate 17.

The heads of the screws 18 include recesses into which the collars of the cups 24 can be knocked over so as to prevent the screws 18 from rotating, after the lifting of the plate 17 and the sealed clamping of thermocouple column, as represented in FIG. 4A.

In this way clamping with the thermocouple column bearing in a sealed manner against the cover 11 which constitutes the upper part of the bearing assembly 9 is achieved.

The sealing device for the thermocouple column perfectly withstands the conditions of pressure and of temperature which prevail inside a nuclear reactor vessel (water containing boric acid at a temperature of 310° C. under pressure of 155 bar).

It should be noted that in cases where the latitude for upwards vertical movement of the thermocouple column is small, for example in cases where the thermocouple column has been deformed in use, it remains possible to provide a perfect seal around the thermocouple column whose scope for vertical movement is reduced.

This is because the clamping ring 28 for the Helicoflex gasket 30 can adapt itself to the remaining scope for movement of the thermocouple column 5.

In this way, sealed clamping of the thermocouple column 5 can be achieved in all cases, by providing a clamping ring 28 of appropriate dimensions, particularly in the axial direction.

The clamping ring can be changed very simply, by virtue of the bayonet means by which the clamping ring is fixed under the cover 11.

Furthermore, it should be noted that in the position for sealed clamping of the thermocouple column, the screws of the compression plate 17 and the screws for fixing the cover 11 are all locked in a single operation by crimping the collar of the cups 24 into the recesses in the heads of the screws 18. The screws 18 engaged by their lower part in the openings 21' in the heads of the screws 21 lock the screws 21 which cannot become unscrewed in operation.

After the thermocouple column has been used for a period of running of the nuclear reactor and after the nuclear reactor has been shut down after its period of running, the thermocouple column and the cover 11 can be removed in order to gain access to the gasket situated under the cover 11.

After the cover 11 has been removed, the clamping ring 28 may, for example, be exchanged in order to make it suit the reduced scope for axial movement of the thermocouple column.

The thermocouple column is removed by uncrimping the collars 24 of the screws 18 and unscrewing the screws 18 in order to lower the compression plate 17 as far as the position in which it is represented in FIG. 4B.

The two-part lifting ring 19 is then removed and the plate 17 is raised so as to detach it from the upper part of the thermocouple column.

The fixing screws 21 of the cover 11 are unscrewed and thus detached from the fixing pieces 22 engaged in the recesses 20 of the tubular length 8.

In cases where a screw 21 is seized in the corresponding fixing piece 22, the fixing piece 22 and the screw 21 are cut through at the external groove 22' of the fixing piece 22.

After the screws 21 have been unscrewed, the cover 11 is lifted and extracted via the upper part of the thermocouple column.

As can be seen in FIGS. 2, 4A and 4B, the cover 11 is penetrated by three openings 26 arranged at 120° from one another between the openings 27 which accommodate the screws 21.

Should the cover 11 remain jammed on the tubular length 8 and the thermocouple column 5 by means of the Helicoflex gaskets, after the screws 21 have been unscrewed, the cover can be extracted by introducing and screwing lifting screws 23 into the openings 26, the lower part of these screws coming into contact with the upper surface of the tubular length 8.

It is thus possible in all events to remove the cover 11.

The device according to the invention thus makes it possible to provide an excellent seal of the thermocouple column irrespective of the scope for axial movement of the thermocouple column and to gain access to the sealing gasket without removing the upper tubular length of the bearing assembly of the thermocouple column. This upper tubular length 8 can therefore be welded permanently to the extension of the adapter penetrating the head of the vessel or made unitary with the extension.

The arrangement of the screws of the lifting plate vertically in line with the screws for attaching the cover with engagement of the lower part of the lifting screws in an opening in the head of a screw for attaching the cover makes it possible easily to lock the screws for attaching the cover, simply by preventing the screws of the compression plate from rotating.

It is possible to use a clamping ring which has a different form from the one described and which includes means for fixing to the cover of the bearing assembly which are other than a bayonet-type fixing.

The tubular length to which the cover is fixed may have cavities different from the three recesses which have been described, for accommodating fixing pieces into which the screws are fixed. For example, a single annular cavity may be provided for accommodating the three fixing pieces.

Finally, the sealing device according to the invention may be applied to any instrumentation column penetrating the head of a nuclear reactor vessel.

I claim:

1. In a pressurized-water nuclear vessel having a head, a plurality of tubular adapters, each fixed into a penetration opening traversing said head and projecting outside the head, and at least one instrumentation column passing through one adapter of said plurality of adapters, a sealing device of said instrumentation column into said one adapter, said sealing device comprising:

(a) a tubular bearing assembly fixed to an end of said adapter outside the head, in an axial extension of said adapter, said instrumentation column being so arranged in said bearing assembly that an end of the instrumentation column projects outside said bearing assembly; and (b) means for pulling on the end of the instrumentation column in an axial direction of the adapter in order to bring a bearing surface of the instrumentation column into contact with sealed bearing means arranged inside said bearing assembly;

(c) said sealed bearing means comprising:

(i) a clamping ring axially movably mounted inside a groove of the tubular bearing assembly and removable therefrom, said clamping ring having a contact surface matching the bearing surface of the instrumentation column; and (ii) at least one annular sealing gasket interposed between a bearing face of the clamping ring opposite the contact surface of said clamping ring and an internal bearing surface of the tubular bearing assembly, and arranged around an external surface of said instrumentation column, said tubular bearing assembly including an annular cover fixed on the end of the adapter through which the instrumentation column passes, and comprising the internal bearing surface of the tubular bearing assembly and said groove for receiving a portion of the clamping ring in an assembled and removable relationship;

(iii) wherein the bearing assembly comprises a tubular section fixed to the outer end of the adapter, and means for assembling the tubular section and the cover, the tubular section including at least one external peripheral cavity and at least three openings penetrating part of the tubular section in its axial direction and emerging in the peripheral cavity, the cover being superposed on the tubular section and including penetration openings in an extension of the openings in the tubular section, the means of assembling the cover and the tubular section including at least three assembly pieces inserted into the peripheral cavity of the tubular section comprising tapped openings in the extension of the openings in the tubular section and in the cover, and assembly screws adapted to be introduced into the aligned openings in the tubular section and in the cover and screwed into the assembly pieces.

2. The sealing device according to claim 1, wherein the tubular section includes three external peripheral cavities arranged angularly at 120° from one another about the axis of the tubular section and three fixing pieces each engaged in an external cavity and having a tapped opening placed in alignment with the openings passing axially through the tubular section and the cover, for the engagement and screwing of an assembly screw.

3. The sealing device according to claim 1, wherein each of the fixing pieces is traversed by two axially-directed openings, a shank which is screw-fastened to the tubular section being engaged in each of said openings, with clearance.

4. The sealing device according to claim 1, wherein the means for pulling the instrumentation column consists of an annular plate engaged via its central opening over an upper end of the thermocouple column, a two-part ring engaged in a groove of the upper part of the thermocouple column and bearing on an upper surface of the plate, and three lifting screws engaged in axially-directed tapped openings passing through the plate and arranged at 120° from one another about the axis of the plate.

* * * * *